US011852174B1

(12) United States Patent
Zak et al.

(10) Patent No.: US 11,852,174 B1
(45) Date of Patent: Dec. 26, 2023

(54) FILTER ASSEMBLY FOR A SERVOVALVE

(71) Applicant: Hamilton Sundstrand Corporation, Charlotte, NC (US)

(72) Inventors: Maciej Zak, Niedoradz (PL); Wojciech Plucinski, Wrzesnia (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/895,673

(22) Filed: Aug. 25, 2022

(30) Foreign Application Priority Data

Aug. 25, 2021 (EP) .................................. 21461579

(51) Int. Cl.
F15B 13/04 (2006.01)
F16K 31/00 (2006.01)
F15B 21/041 (2019.01)
F15B 13/043 (2006.01)
F16K 31/124 (2006.01)
F16K 31/06 (2006.01)

(52) U.S. Cl.
CPC ........ *F15B 21/041* (2013.01); *F15B 13/0438* (2013.01); *F16K 31/0613* (2013.01); *F16K 31/124* (2013.01)

(58) Field of Classification Search
CPC ................ F15B 21/041; F15B 13/0438; F15B 2211/615; F16K 31/124
See application file for complete search history.

(56) References Cited

U.S. PATENT DOCUMENTS

| 2,861,550 | A | | 11/1958 | Hanna et al. |
| 3,592,234 | A | * | 7/1971 | Baltus ................. F15B 13/0438 137/625.62 |
| 3,712,339 | A | | 1/1973 | Bartholomaus et al. |
| 3,857,541 | A | * | 12/1974 | Clark ................. F15B 13/0438 251/30.05 |
| 4,922,963 | A | | 5/1990 | Robinson |
| 4,922,964 | A | | 5/1990 | Buscher |

(Continued)

FOREIGN PATENT DOCUMENTS

| CN | 104454729 A | 3/2015 |
| EP | 0119752 A1 | 9/1984 |
| GB | 2104249 A | 3/1983 |

OTHER PUBLICATIONS

Abstract for CN104454729 (A), Published: Mar. 25, 2015, 1 page.
European Search Report for Application No. 21461579.1, dated Feb. 4, 2022, 7 pages.

*Primary Examiner* — Kelsey E Cary
(74) *Attorney, Agent, or Firm* — CANTOR COLBURN LLP

(57) ABSTRACT

A filter assembly for a servo valve that includes a first fluid nozzle defining a first fluid passage therethrough between a first fluid inlet and a first fluid outlet and a second fluid nozzle defining a second fluid passage therethrough between a second fluid inlet and a second fluid outlet. The first and second fluid nozzles arranged in end to end abutment with each other to form a tubular fluid nozzle unit in which the first and second fluid inlets are adjacent each other, and the first and second fluid passages align to form a common fluid passage through the tubular fluid nozzle unit. The first fluid outlet is at a first end of the tubular fluid nozzle unit and the second fluid passage being at a second, end of the tubular fluid nozzle unit.

13 Claims, 3 Drawing Sheets

(56) References Cited

U.S. PATENT DOCUMENTS

| | | | |
|---|---|---|---|
| 9,309,900 B2 | 4/2016 | Kopp | |
| 2015/0047729 A1 | 2/2015 | Kopp et al. | |
| 2018/0340555 A1* | 11/2018 | Cis | F16K 31/128 |
| 2020/0309164 A1* | 10/2020 | Sawicki | F16K 1/427 |
| 2021/0331102 A1* | 10/2021 | Zak | F15B 13/0438 |

* cited by examiner

1st stage Filter with constant Nozzles

Supply Pressure

FILTER ASSEMBLY FOR A SERVOVALVE

CROSS-REFERENCE TO RELATED APPLICATIONS

This application claims priority to European Patent Application No. 21461579.1 filed Aug. 25, 2021, the entire contents of which is incorporated herein by reference.

TECHNICAL FIELD

The present disclosure relates to a filter assembly for a servo valve. The following description also relates to a servo valve comprising a filter assembly, and more specifically a two-stage servo valve comprising a filter assembly for a first stage.

BACKGROUND

Servo valves find a wide range of applications for controlling air, fuel, oil or other fluid flows to effect driving or control of another part, e.g., an actuator or in fuel control systems.

A servo valve assembly may include a drive assembly such as a torque motor controlled by a control current, a pressure divider, and a hydraulic amplifier composed of a spool and sleeve control valve which controls fluid flow to or from an actuator. Generally, a servo valve transforms an input control signal into movement of an actuator cylinder. The actuator controls another component which, in some examples, may be a valve. In other words, a servo valve acts as an electro/hydraulic transducer, which commands an actuator, that changes the position of a valve's flow modulating feature.

Such mechanisms are used, for example, in various parts of an aircraft where the management of fluid/air flow is required, such as in engine fuel control, oil flow, engine bleeding systems, anti-ice systems, air conditioning systems and cabin pressure systems. Servo valves also are widely used to control the flow and pressure of pneumatic and hydraulic fluids to an actuator, e.g. to control moving parts such as flight control surfaces, flaps, landing gear, and in applications where accurate position or flow rate control is required. Some examples of applications are aircraft, automotive systems and in the space industry.

Conventionally, servo valve systems operate by obtaining pressurised fluid from a high pressure source which is transmitted through a load from which the fluid is output as a control fluid. Various types of servo valves are known, examples of which are described in UK Patent Application No. GB 2104249A, U.S. Patent Application Publication No. 2015/0047729 and U.S. Pat. No. 9,309,900.

Electrohydraulic servo valves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. With a two-stage servo valve, in a first stage typically a flapper is deflected by action of an armature connected to the motor away or towards nozzles, which controls the fluid flow through the nozzles. The nozzles cooperating with the flapper are connected to the valve pressure supply port via constant nozzles. Four nozzles with appropriate hydraulic conductivity together with the flapper, build a hydraulic pressure divider system with a modulated pressure ratio proportional to the position of the flapper in relation to the variable nozzles. Deflection of the flapper can control the amount of fluid injected from the nozzles, and thus control of a movable spool in a second stage. The second stage acts to control an actuator. In this way, servo valves allow precise control of actuator movement.

During use, contaminants in the fluid passing through the servo valve may cause blockages. Blockages are known to occur in the first stage due to the small gaps between the flapper and the nozzles. Accordingly servo valves are typically provided with particulate filters to filter contaminants in the fluid passing through the servo valve.

Various locations for filters to filter the first stage fluid are known. Such filters may be provided in the supply fluid line or in the supply fluid channels which direct a lower pressure supply fluid to the first stage nozzles. It can be difficult to design filters that can be easily and reliably assembled into the fluid flow path without substantially adding to the overall size and weight of the system.

One conventional filter assembly, that will be described below with reference to FIGS. 1 to 4, uses a filter member in the form of a perforated tube that is press-fit in the space between opposing constant orifice nozzles or restrictors that are provided in the fluid flow path between the supply port and the variable nozzles adjacent the flapper in the first stage. Because the filter member is assembled by being press-fit between the nozzles, it needs to be robust and thick to avoid it being deformed or collapsing due to the pressing force on assembly. The use of a thick material, however, means that it is more difficult to form the perforations through the material, resulting in more costly and time intensive manufacture of the filter. Also, the perforations are likely to have a conical shape which may adversely affect the filtering performance. Further, in order the limit the force that needs to be applied to assemble the filter, the interference fit should be limited—i.e. the space into which the filter member is pressed should be as large as possible whilst still providing a securing function to hold the filter member. The manufacturing tolerances are, therefore, very tight. The accuracy required also increases the time and cost of manufacture.

The inventors have identified a need for an improved filter assembly for filtering first stage fluid in a servo valve system.

SUMMARY

According to this disclosure, there is provided filter assembly for a servo valve comprising: a first fluid nozzle defining a first fluid passage therethrough between a first fluid inlet and a first fluid outlet; a second fluid nozzle defining a second fluid passage therethrough between a second fluid inlet and a second fluid outlet; the first and second fluid nozzles arranged in end to end abutment with each other to form a tubular fluid nozzle unit in which the first and second fluid inlets are adjacent each other, and the first and second fluid passages align to form a common fluid passage through the tubular fluid nozzle unit, the first fluid outlet being at a first end of the tubular fluid nozzle unit and the second fluid passage being at a second, end of the tubular fluid nozzle unit; a recess formed around an outer surface of the tubular fluid nozzle unit in a region where the first and second fluid inlets are located; and a perforated filter member provided in the recess around the tubular fluid nozzle unit and across the first and second fluid inlets.

Also provided is a servo valve comprising: a fluid supply; a first stage of the servo valve; a second stage of the servo valve; and a filter assembly as defined above, wherein the filter assembly filters fluid from the fluid supply to the first stage of the servo valve.

Also provided is a method of forming a filter assembly for a servo valve comprising: providing a first fluid nozzle defining a first fluid passage therethrough between a first fluid inlet and a first fluid outlet; providing a second fluid nozzle defining a second fluid passage therethrough between a second fluid inlet and a second fluid outlet; positioning the first and second fluid nozzles in end to end abutment with each other to form a tubular fluid nozzle unit in which the first and second fluid inlets are adjacent each other, and the first and second fluid passages align to form a common fluid passage through the tubular fluid nozzle unit, the first fluid outlet being at a first end of the tubular fluid nozzle unit and the second fluid passage being at a second end of the tubular fluid nozzle unit; providing a perforated filter member in a recess formed around an outer surface of the tubular fluid nozzle unit across a region where the first and second fluid inlets are located.

Preferred embodiments will now be described with reference to the drawings.

DETAILED DESCRIPTION

Servo valves are generally used when accurate position control is required, such as, for example, control of a primary flight surface. Servo valves can be used to control pneumatic or hydraulic actuators or motors. They are common in industries which include, but are not limited to, automotive systems, aircraft and the space industry.

Figures 1, 2:
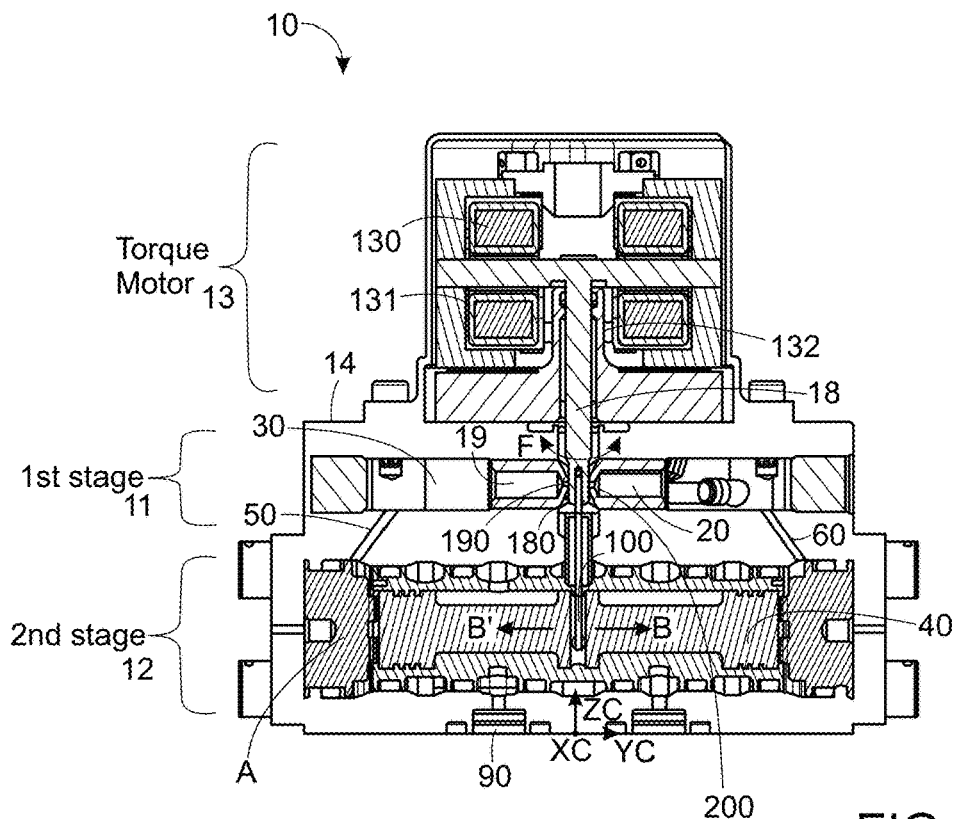
FIG. 1 is a sectional view of a conventional flapper type servo valve assembly.
FIG. 2 is an alternative section view, taken behind the section of FIG. 1, of a conventional assembly as shown in FIG. 1.

FIG. 1 shows generally a known arrangement of a flapper and nozzle servo valve.

The servo valve 10 is a two-stage servo valve comprising a first stage 11 and a second stage 12. The servo valve 10 comprises an electric motor 13, typically a torque motor. The first stage 11 is provided between the electric motor 13 and the second stage. The motor 13 and first and second stages 11, 12 of the servo valve 10 are in a housing 14.

The electric motor 13 comprises permanent magnets 130, coils 131, and an armature 132 (not shown). The coils electrically communicate with an electrical supply (not shown) and, when activated, interact with the permanent magnets to create movement of the armature. In the example shown, two sets of coils are provided to provide redundancy in case one set fails. This is particularly important in safety-critical applications such as in aircraft.

The servo valve works by the flow of a working fluid, such as a hydraulic fluid. Hydraulic fluid is, for example, fuel or oil. The system includes a fluid supply (not shown) which provides pressurized supply fluid 16 via a supply port 17 and to the first and second stages.

The first stage 11 of the servo valve comprises a flapper 18 which is actuated by the electric motor 13. The armature 132 of the electric motor 13 causes the flapper 18 to be deflected in the direction indicated by arrow F according to a control signal that determines the size and direction of the applied current.

The first stage 11 comprises two axially aligned, opposed first stage nozzles 19, 20. The first stage nozzles 19, 20 are housed within a nozzle chamber 30 and comprise fluid outlets 190, 200 which are spaced apart from each other. The distal end 180 of the flapper 18 is located between the fluid outlets of the two nozzles 19, 20.

FIG. 1 shows the flapper 18 in the neutral position with its distal end equidistant from each nozzle outlet 190, 200.

In operation, supply fluid 18 flows through the supply fluid port 17 and into the interior of the spool 40 of the second stage 12. Supply fluid also flows via channels 50, 60 into the nozzle chamber 30 at either end of the nozzles, via restrictors or constant orifice nozzles 70, 80. The fluid flows out of the nozzle chamber via the nozzles 19, 20 via their fluid outlets 190, 200 through a return line and out of a return port. When the flapper 18 is in the neutral position, the pressure of fluid on both ends of the servo valve is the same and the spool 40 of the second stage 12 is held in an axially centered position in the housing. In this position, an outlet port of the spool is aligned with the return line and so fluid flows through the spool to the return port.

In the event that the servo valve is to supply pressurized fluid to a control output 90, a control signal is generated (not shown) to cause a control current to be applied to the motor 13. This causes the flapper 18 to deflect relative to the first stage nozzles 19, 20 in a direction determined by the applied current. Current applied in one direction will cause the flapper distal end 180 to deflect towards nozzle 19, current in the opposite direction will cause the flapper end to deflect towards nozzle 20. If the end of the flapper closes off the outlet 190 of nozzle 19, fluid in the chamber 30 behind that nozzle, and in channel 50, will not be able to flow out of the nozzle and so the pressure at that end of the first stage will increase compared to the lower pressure on the other side of the valve where the fluid can still flow through nozzle 20. The increase of pressure will result in an increase in pressure at the corresponding end A of the second stage spool 40 causing the spool 40 to move axially in the housing in direction B. This movement will misalign the interior of the spool with the return port and, instead, will align it with a control port 90 to output pressurized fluid to e.g. an actuator. If the current applied to the motor causes the flapper to move towards nozzle 20, the spool 40 will move axially in direction B'. A control wire 100 is attached to the spool (here closely fits in a slot in the spool) and therefore moves with the spool. The control wire sends a signal back to a controller (not shown) to feedback the axial position of the spool.

As mentioned above, and as seen in FIG. 2, the supply fluid enters the nozzles 19, 20 via restrictors or constant orifice nozzles 70, 80 spaced apart to feed the fluid at a lower pressure to the respective nozzle 19, 20.

A filter assembly 300 is disposed between the two constant orifice nozzles 70, 80. The filter assembly 300 filters the working fluid provided to the first stage from the fluid supply. The filter assembly 300 prevents contaminants from entering the first stage 11, and, in particular from reaching the first stage nozzles and the flapper of the first stage 11. Because the nozzles 19, 20 are so small and the spacing between the nozzles 19, 20 and the flapper end 180 is also very small, the effect of any contaminants or particles here can have substantial adverse consequences on the operation of the servo valve.

The filter assembly 300 is press-fitted in the space 400 between the two restrictor nozzles 70, 80.

Figure 3:
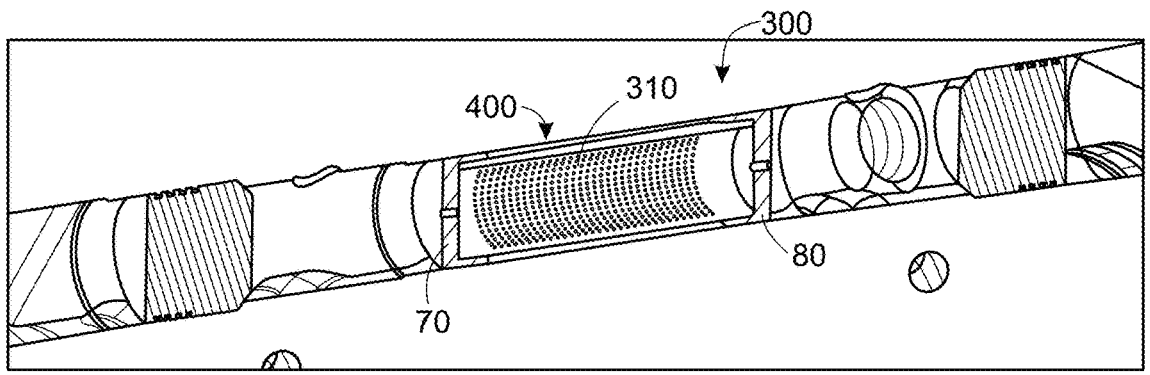
FIG. 3 shows the filter of FIGS. 1 and 2 in more detail.
Figure 4:
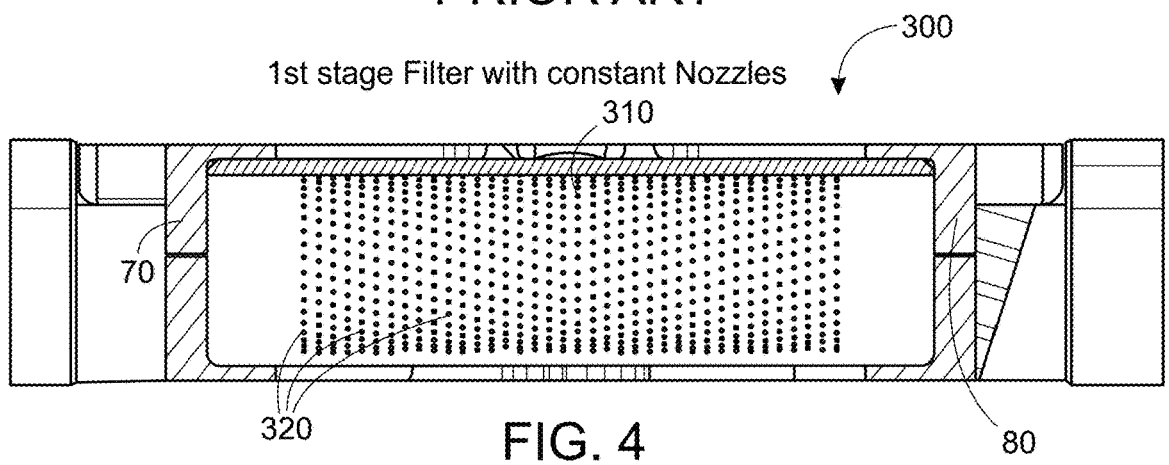
FIG. 4 shows a closer view of the filter of FIG. 3.

Referring now to FIGS. 3 and 4, the filter assembly 300 will now be described in detail. The filter assembly 30 comprises a filter member 310 and the nozzles 70, 80. The filter member 310 is tubular and has an array of holes 320 formed therethrough. The array of holes 320 are usually formed by laser drilling, but could be formed in other ways e.g. by photo-etching.

Upon assembly of the filter assembly 300, with reference to FIGS. 3 and 4, the tube 320 will be press-fit into the opposing, spaced apart nozzles 70, 80. In this way, supply fluid 16 will pass through the perforated filter member 310 before flowing through the nozzles 70, 80 to the first stage variable nozzles 19, 20.

As mentioned above, although such a filter works well once assembled, and does not require much space in the servo valve, it needs to be made thick enough to withstand the force applied by pressing to secure the filter member 310 in place between the opposing nozzles 70, 80. The required thickness is, however, difficult to perforate using known techniques such as laser drilling.

The filter assembly of the present disclosure, shown, for example in FIGS. 5 to 8. Here, the constant nozzles 70', 80' are provided as cylindrical bodies that abut against each other to define the constant nozzles in a single tubular unit. The tubular unit has, between its ends, across the fluid flow ports, a recessed area 320 extending around the periphery. The recessed area 320 receives the filter member 500 which is a perforated sheet extending around the tubular unit, covering the fluid flow ports.

Because the constant nozzles 70', 80' form a single unit, they provide support for the filter member 500 as it is assembled so that it cannot collapse or deform when pushed into position. Because of this support, the filter member can be made of a thinner material that was previously the case. The perforations can be quickly and easily formed in the filter material by known techniques such as laser drilling.

Figure 5:
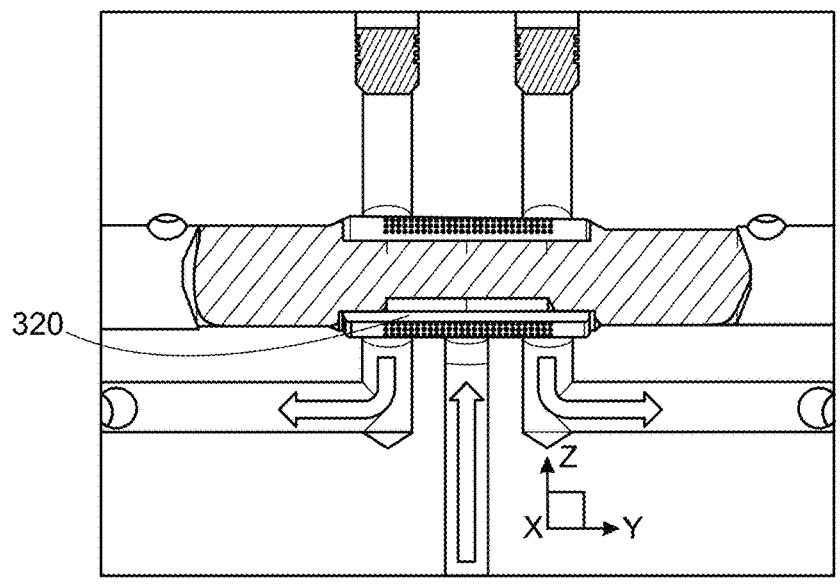
FIG. 5 is a sectional view of a filter assembly according to the present disclosure.
Figure 6:
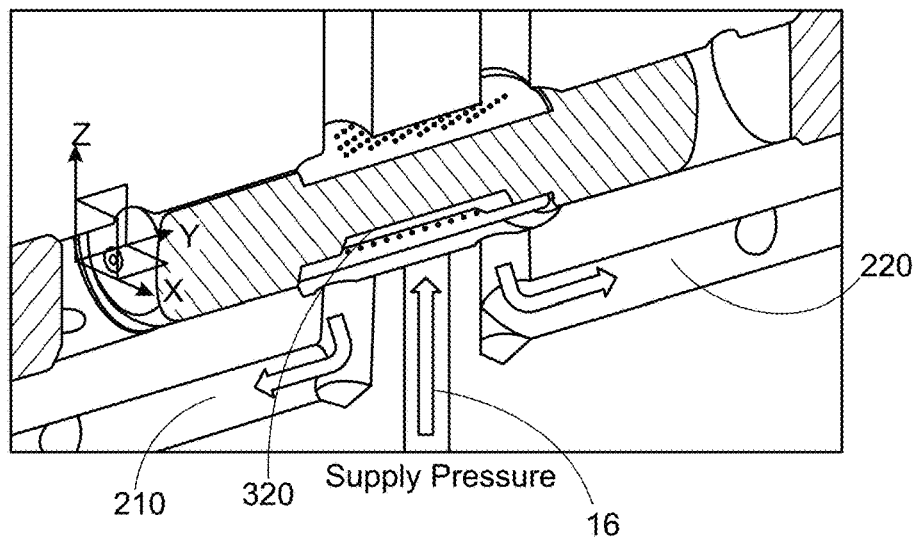
FIG. 6 is a perspective view of the assembly of FIG. 5.
Figure 7:
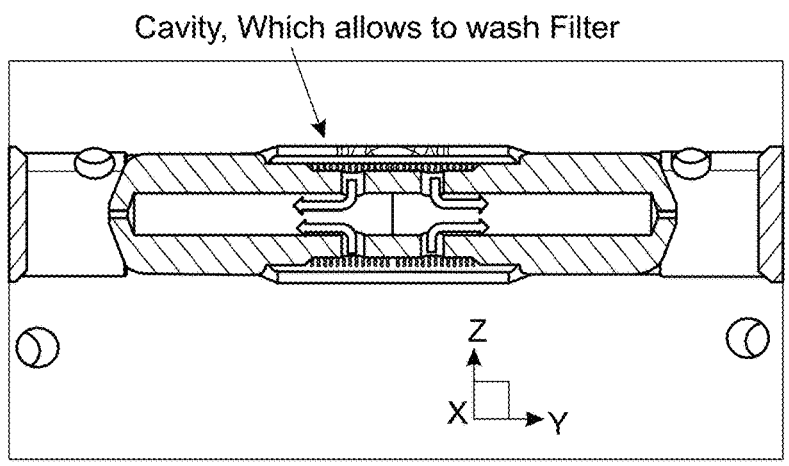
FIG. 7 shows direction of fluid through the filter in cross-section.
Figure 8:
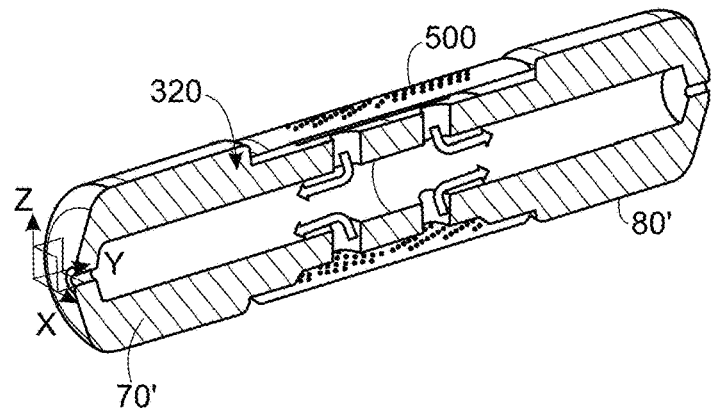
FIG. 8 is a perspective view of FIG. 7.

FIGS. 5 and 6 show the fluid flow path for the supply fluid 16. Supply fluid for the second stage flows across the outer surface of the filter member 500 and along channels 210, 220 into the spool 40 of the second stage. Fluid for the first stage flows across the filter member via the perforations through the nozzles 70', 80' (FIGS. 7 and 8) from where it flows to the variable flow nozzles 19, 20 and through the outlets 190, 200 depending on the position of the flapper 18. The supply fluid for the second stage performs a washing function of the filter member.

The material used for the filter member may be the same as that used for the nozzles so that both components have the same coefficient of thermal expansion, e.g. A286 alloy or CRES which works well in combination with an aluminum housing in terms of thermal expansion. Different materials can, however, be used.

The filter assembly provides effective filtering without the need for additional parts and can be easily, quickly and reliably assembled using lighter, thinner materials than for the known systems.

While the disclosure is provided in detail in connection with only a limited number of embodiments, it should be readily understood that the disclosure is not limited to such disclosed embodiments. Rather, the disclosure can be modified to incorporate any number of variations within with the scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A filter assembly for a servo valve comprising:
   a first fluid nozzle defining a first fluid passage therethrough between a first fluid inlet and a first fluid outlet;
   a second fluid nozzle defining a second fluid passage therethrough between a second fluid inlet and a second fluid outlet;
   the first and second fluid nozzles arranged in end to end abutment with each other to form a tubular fluid nozzle unit in which the first and second fluid inlets are adjacent each other, and the first and second fluid passages align to form a common fluid passage through the tubular fluid nozzle unit, the first fluid outlet being at a first end of the tubular fluid nozzle unit and the second fluid passage being at a second, end of the tubular fluid nozzle unit;
   a recess formed around an outer surface of the tubular fluid nozzle unit in a region where the first and second fluid inlets are located; and
   a perforated filter member provided in the recess around the tubular fluid nozzle unit and across the first and second fluid inlets.

2. The filter assembly as claimed in claim 1, wherein the perforated filter member is a tubular member extending around the tubular fluid nozzle unit.

3. The filter assembly as claimed in claim 1, wherein the perforated filter member is press fit into the recess.

4. The filter assembly as claimed in claim 1, wherein the perforated filter member is recessed with respect to the tubular fluid nozzle unit to define a cavity across which fluid can flow to wash the filter member.

5. A servo valve comprising:
   a fluid supply;
   a first stage of the servo valve;
   a second stage of the servo valve; and
   a filter assembly of any preceding claim;
   wherein the filter assembly filters fluid from the fluid supply to the first stage of the servo valve.

6. The servo valve as claimed in claim 5, wherein the first stage comprises a flapper moveable between first and second variable nozzles to control the fluid flow from the first and second variable nozzles so as to vary the pressure acting on the second stage.

7. The servo valve as claimed in claim 5, wherein the second stage comprises a moveable spool, axially moveable in response to a pressure differential across its ends controlled by the first stage.

8. The servo valve as claimed in claim 7, wherein the first stage comprises a flapper moveable between first and second variable nozzles to control the fluid flow from the first and second variable nozzles so as to vary the pressure acting on the second stage further comprising:
   a supply fluid port via which fluid flows from the fluid supply to the first stage and to the second stage, the supply fluid flowing to the first stage via first and second channels, respectively, to the first and second variable nozzles.

9. The servo valve as claimed in claim 5, further comprising a torque motor arranged to control the first stage in response to a command.

10. The servo valve assembly as claimed in claim 9, wherein the torque motor causes movement of the flapper relative to the first and second variable nozzles to control fluid flow through the first and second variable nozzles to control movement of the second stage.

11. The servo valve assembly as claimed in claim 5, wherein the first stage includes the first and second fluid nozzles and the perforated filter member.

12. A method of forming a filter assembly for a servo valve comprising:
- providing a first fluid nozzle defining a first fluid passage therethrough between a first fluid inlet and a first fluid outlet;
- providing a second fluid nozzle defining a second fluid passage therethrough between a second fluid inlet and a second fluid outlet;
- positioning the first and second fluid nozzles in end to end abutment with each other to form a tubular fluid nozzle unit in which the first and second fluid inlets are adjacent each other, and the first and second fluid passages align to form a common fluid passage through the tubular fluid nozzle unit, the first fluid outlet being at a first end of the tubular fluid nozzle unit and the second fluid passage being at a second end of the tubular fluid nozzle unit; and
- providing a perforated filter member in a recess formed around an outer surface of the tubular fluid nozzle unit across a region where the first and second fluid inlets are located.

13. The method of claim 12, comprising press fitting the perforated filter member into the recess.

\* \* \* \* \*